United States Patent
Ha et al.

(10) Patent No.: US 10,235,542 B2
(45) Date of Patent: Mar. 19, 2019

(54) JEWELRY INCLUDING ETCHED OR PRINTED INFORMATION AND METHOD TO OPTICALLY OR WIRELESSLY ACCESS DIGITAL REPLICA OF THE ETCHED OR PRINTED INFORMATION

(71) Applicants: NanoRosetta, LLC, Rochester, NY (US); Bruce Ha, Brockport, NY (US); Sarah Ha, Brockport, NY (US); Carla J. Froehler, Pittsford, NY (US); James J. Froehler, Pittsford, NY (US)

(72) Inventors: Bruce Ha, Brockport, NY (US); Sarah Ha, Brockport, NY (US); Carla J. Froehler, Pittsford, NY (US); James J. Froehler, Pittsford, NY (US)

(73) Assignee: NANOROSETTA, LLC, Rochester, NY (US)

( * ) Notice: Subject to any disclaimer, the term of this patent is extended or adjusted under 35 U.S.C. 154(b) by 0 days.

(21) Appl. No.: 15/612,283

(22) Filed: Jun. 2, 2017

(65) Prior Publication Data

US 2017/0351887 A1    Dec. 7, 2017

Related U.S. Application Data

(60) Provisional application No. 62/344,727, filed on Jun. 2, 2016.

(51) Int. Cl.
*G06K 7/10* (2006.01)
*G06K 19/06* (2006.01)
*G06K 7/14* (2006.01)
*G07D 5/00* (2006.01)

(52) U.S. Cl.
CPC ....... *G06K 7/10297* (2013.01); *G06K 7/1417* (2013.01); *G06K 19/06037* (2013.01); *G07D 5/00* (2013.01)

(58) Field of Classification Search
None
See application file for complete search history.

(56) References Cited

U.S. PATENT DOCUMENTS

| 5,726,435 | A | 3/1998 | Hara et al. |
| 6,360,948 | B1 | 3/2002 | Yang et al. |
| 7,830,573 | B2 | 11/2010 | Ha |
| 7,877,847 | B2* | 2/2011 | Bills ................. F23G 1/00 110/194 |
| 8,820,648 | B2* | 9/2014 | Shankman ........... G01H 13/00 235/492 |
| 8,881,990 | B2 | 11/2014 | Hunt et al. |
| 9,373,011 | B2* | 6/2016 | Ahmadloo ........ G06K 7/10168 |
| 9,444,524 | B2 | 9/2016 | Huynh |
| 9,613,412 | B1* | 4/2017 | Olson ............. G06F 17/30268 |
| 2005/0103840 | A1* | 5/2005 | Boles ................ G01N 21/87 235/385 |
| 2006/0096873 | A1* | 5/2006 | Fromm ............. A63H 33/38 206/232 |
| 2009/0070238 | A1* | 3/2009 | Moryto ............ G06Q 10/087 705/28 |
| 2009/0070273 | A1* | 3/2009 | Moryto ............ G06Q 10/087 705/80 |
| 2015/0084745 | A1* | 3/2015 | Hertz ................ H04W 4/02 340/10.3 |
| 2015/0128694 | A1* | 5/2015 | Shankman ........... G01H 13/00 73/163 |
| 2015/0283845 | A1* | 10/2015 | Marcus ............ B42D 15/027 235/380 |

\* cited by examiner

*Primary Examiner* — Christle I Marshall
(74) *Attorney, Agent, or Firm* — Rossi, Kimms & McDowell LLP

(57) ABSTRACT

A jewelry article, and systems and methods for accessing human readable information printed or etched on the jewelry article are disclosed. The printed or etched human readable information included in the jewelry article cannot be viewed without a visual aid. The jewelry article includes a wireless or optical tag corresponding to the printed or etched human readable information. The wireless or optical tag is associated with an electronic file corresponding to the printed or etched human readable information. The wireless or optical tag is configured to be readable by an external reader connected to an external database that stores the electronic file corresponding to the printed or etched human readable information. The external reader is configured to read the wireless or optical tag to access the associated electronic file stored in the external database. Information included in the electronic file may be displayed on a display.

18 Claims, 7 Drawing Sheets

JEWELRY INCLUDING ETCHED OR PRINTED INFORMATION AND METHOD TO OPTICALLY OR WIRELESSLY ACCESS DIGITAL REPLICA OF THE ETCHED OR PRINTED INFORMATION

CROSS-REFERENCE TO RELATED APPLICATIONS

This application claims the benefit of U.S. Provisional Application No. 62/344,727, filed Jun. 2, 2016, the entire disclosure of which is hereby incorporated herein by reference.

TECHNICAL FIELD

The present invention is generally related to the field of jewelry products with micro- or nano-sized printed or etched features representing readable information with or without pseudo holographic images, and more particularly to systems and methods for access and retrieval of a digital replica of the micro- and nano-sized printed or etched features on the jewelry products.

BACKGROUND OF THE INVENTION

A current trend in wearable fashion is to embed technology as wearable technology. One such application is the micro- or nano-etching of jewelry such as metal, pearl, or stones, with information that can uniquely identify the jewelry and/or contain information meaningful to the wearer. An example is a NanoRosetta® medallion which can include all the text of the Bible or the lifetime written works of Shakespeare.

To contain such vast amounts of texts, the letters of the text must be reduced down to several microns or less. The smaller the text or images, the higher the magnification and the more advanced the scanning reading devices need to be. For example a high powered high resolution microscope would be needed to read back the books on the NanoRosetta® medallion. For even smaller features, an Atomic Force Microscope, Scanning Electron Microscope, or White Light Interferometer would be needed to recover the written information.

Several methods currently used to create small-sized physical features by printing or etching information such as text or images on jewelry are described, for example, in U.S. Pat. No. 7,830,573, the entire disclosure of which is hereby incorporated herein by reference. The physical features produced by the diffraction patterns etched or printed on the jewelry article may be too small to read without visual aids such as those discussed above. However, a wearer of such jewelry article may desire to read the etched or printed human readable information, even when they do not have access to an optical visual aid.

Further, U.S. Pat. No. 9,444,524 discloses methods for sharing of electronic messages using an NFC chip embedded in a gemstone, such as a pearl. An NFC writer is used to first write information, such as an associated remembrance or memory of an event in an encoded format such as a digital audio or video file, into the NFC chip in the form of an electronic file. When the gemstone with the recorded NFC data is subsequently provided close to a different NFC device, the information recorded in the NFC chip can be accessed by the NFC device, thus accessing the stored remembrance or memory of the event.

However, there is no association between the information recorded on the NFC chip and any human readable information printed or etched on the jewelry article. Furthermore, given the vast amount of information that could be recorded in micro- or nano-sized human readable text or images on the jewelry article, an NFC chip may not even have the storage capacity to store such data.

Further, U.S. Pat. No. 5,726,435 discloses methods for storing data by generating two-dimensional codes as an image, otherwise generally known as QR codes, as a binary coded plurality of cells on objects that can then be optically detected and decoded for inputting information into a computer or the like. A method of reading such system to recover the stored data is disclosed in U.S. Pat. No. 6,360,948. A use of the QR code is contemplated in U.S. Pat. No. 8,881,990, where the code is printed on a medical bracelet or worn jewelry containing pertinent medical information either directly from the QR code or from a dedicated website. The invention describes a way to retrieve a URL and a PIN number in a compact way to replace the information that would be too large to be printed onto the jewelry article.

However, none of the above discussed references contemplate associating the information recorded on the QR code and any human readable information printed or etched on the jewelry article. Furthermore, the low storage limitation of the QR code would prohibit storage of the human readable information. The difference between the current invention and medical bracelet is the how the QR code is used. The medical bracelet application uses the QR code because it cannot print all the information. The current invention uses the QR code as a convenient alternative to read the printed human readable information printed or etched into the jewelry.

Accordingly, there is a need for providing a wearer of a jewelry article including micro- or nano-sized etched or printed human readable information to be able to access such information without the use of a visual aid.

SUMMARY OF THE INVENTION

At least the above-discussed need is addressed and technical solutions are achieved in the art by various embodiments of the present invention. In some embodiments, jewelry articles, systems, and methods are provided for accessing a digital replica of the printed or etched information on the jewelry article using a wireless or optical tag provided in, or proximate to, the jewelry article.

In some embodiments, a jewelry article includes printed or etched human readable information that cannot be viewed without a visual aid, and a wireless or optical tag corresponding to the printed or etched information. In some embodiments, the wireless or optical tag is associated with an electronic file corresponding to the printed or etched human readable information. In some embodiments, the wireless or optical tag is configured to be readable by an external reader connected to an external database that stores the electronic file corresponding to the printed or etched human readable information. In some embodiments, the external reader is configured to read the wireless or optical tag to access the associated electronic file stored in the external database. In some embodiments, the wireless or optical tag may store a unique code corresponding to the printed or etched human readable information, the unique code associated with the electronic file corresponding to the printed or etched human readable information.

In some embodiments, the electronic file may include a digital replica of the printed or etched human readable information or may include additional digital content associated with the printed or etched human readable information. In some embodiments, the printed or etched human readable information may include one or more of micro-sized or nano-sized text, image, video, audio, or other multimedia information. In some embodiments, the external reader is further configured to display information included in the associated electronic file stored in the external database.

In some embodiments, the wireless tag may include an RF chip or an NFC chip. In some embodiments, the wireless tag may be provided proximate a portion of the jewelry article where the human readable information is printed or etched. In some embodiments, the optical tag may include a QR code or a unique symbol. In some embodiments, the optical tag may be printed or etched on the jewelry article.

In some embodiments, the wireless or optical tag may include security information to permit the external reader to access the external database and retrieve the associated electronic file corresponding to the printed or etched human readable information.

In some embodiments, a system comprises a jewelry article including printed or etched human readable information that cannot be viewed without a visual aid and a wireless or optical tag corresponding to the printed or etched human readable information, and an external database configured to store an electronic file corresponding to the printed or etched human readable information. In some embodiments, the wireless or optical tag is associated with the stored electronic file and is configured to be readable by an external reader connected to the external database. In some embodiments, the external reader is configured to read the wireless or optical tag to access the associated electronic file stored in the external database.

In some embodiments, a method of accessing an electronic file corresponding to printed or etched human readable information on a jewelry article comprises providing the jewelry article including the printed or etched human readable information that cannot be viewed without a visual aid, the jewelry article including a wireless or optical tag corresponding to the printed or etched human readable information, the wireless or optical tag configured to be readable by an external reader, providing an external database configured to store an electronic file corresponding to the printed or etched human readable information, wherein the wireless or optical tag is associated with the stored electronic file, and reading the wireless tag with the external reader to access the associated electronic file stored in the external database.

Various embodiments of the present invention may include systems or devices that are or include combinations or subsets of any or all of the systems or devices and associated features thereof described herein.

Further, all or part of any or all of the systems or devices discussed herein or combinations or sub-combinations thereof may implement or execute all or part of any or all of the methods and processes discussed herein or combinations or sub-combinations thereof.

Any of the features of all or part of any or all of the methods and processes discussed herein may be combined with any of the other features of all or part of any or all of the methods and processes discussed herein. In addition, a computer program product may be provided that comprises program code portions for performing some or all of any or all of the methods and processes and associated features thereof described herein, when the computer program product is executed by a computer or other computing device or device system. Such a computer program product may be stored on one or more computer-readable storage mediums, also referred to as one or more computer-readable data storage mediums.

In some embodiments, each of any or all of the computer-readable data storage medium systems (also referred to as processor-accessible memory device systems) described herein is a non-transitory computer-readable (or processor-accessible) data storage medium system (or memory device system) including or consisting of one or more non-transitory computer-readable (or processor-accessible) storage mediums (or memory devices) storing the respective program(s) which may configure a data processing device system to execute some or all of one or more of the methods and processes described herein.

Further, any or all of the methods and associated features thereof discussed herein may be implemented or executed by all or part of a device system, apparatus, or machine, such as all or a part of any of the systems, apparatuses, or machines described herein or a combination or sub-combination thereof.

BRIEF DESCRIPTION OF DRAWINGS

It is to be understood that the attached drawings are for purposes of illustrating aspects of various embodiments and may include elements that are not to scale.

DETAILED DESCRIPTION

Figure 1:
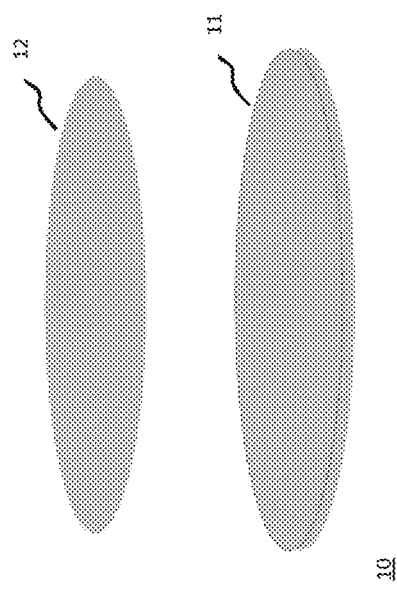
FIG. 1 shows a jewelry article, according to some embodiments of the present invention.

As discussed above, a jewelry article can include printed or etched human readable information that cannot be viewed without a visual aid. Such information could be, for example, micro- or nano-sized human readable text, image, or other multimedia. However, a visual aid may not always be available. The inventors of the present invention realized that an owner of the jewelry article may want to access and retrieve the printed or etched human readable information on the jewelry article even in a case where a visual aid may not be available. The inventors of the present invention also note that it is not practical to always carry a visual aid, such as a microscope, for optically reading or viewing the printed or etched human readable information. For at least this reason, the inventors of the present invention realized that the owner of the jewelry article would not be able to access the printed or etched information if they did not have a visual aid.

In light of at least these shortcomings of the conventional jewelry article, the inventors of the present invention have invented and describe herein (i.e., including the figures), among other notable features described herein, an improved jewelry article that includes a wireless or optical tag corresponding to the printed or etched human readable information, according to at least some embodiments of the invention. In some embodiments, the wireless or optical tag is associated with an electronic file corresponding to the printed or etched human readable information. In some embodiments, the wireless or optical tag is configured to be readable by an external reader connected to an external database that stores the electronic file corresponding to the printed or etched human readable information. In some embodiments, the external reader is configured to read the wireless or optical tag to retrieve the associated electronic file stored in the external database. In some embodiments, the external reader is configured to display information included in the electronic file on the external reader or an associated display unit for reading or viewing by the owner.

In this manner, the owner of the jewelry article can access, and read or view, the printed or etched human readable information even when they don't have a visual aid to optically read or view the printed or etched information directly. The inventors of the present invention have not found the conventional jewelry article having printed or etched micro- or nano-sized human readable information to contemplate such features or benefits.

In the following description, certain specific details are set forth in order to provide a thorough understanding of various inventive embodiments. However, one skilled in the art will understand that other embodiments may be practiced without these details. In other instances, well-known structures have not been shown or described in detail to avoid unnecessarily obscuring descriptions of various inventive embodiments.

Any reference throughout this specification to "one embodiment" or "an embodiment" or "an example embodiment" or "an illustrated embodiment" or "a particular embodiment" and the like means that a particular feature, structure or characteristic described in connection with the embodiment is included in at least one embodiment. Thus, any appearance of the phrase "in one embodiment" or "in an embodiment" or "in an example embodiment" or "in this illustrated embodiment" or "in this particular embodiment" or the like in this specification is not necessarily all referring to one embodiment or a same embodiment. Furthermore, the particular features, structures or characteristics of different embodiments may be combined in any suitable manner to form one or more other embodiments.

Unless otherwise explicitly noted or required by context, the word "or" is used in this disclosure in a non-exclusive sense. In addition, unless otherwise explicitly noted or required by context, the word "set" is intended to mean one or more. For example, the phrase, "a set of objects" means one or more of the objects. In addition, unless otherwise explicitly noted or required by context, the word "subset" is intended to mean a set having the same or fewer elements of those present in the subset's parent or superset.

Further, the phrase "at least" is or may be used herein at times merely to emphasize the possibility that other elements may exist besides those explicitly listed. However, unless otherwise explicitly noted (such as by the use of the term "only") or required by context, non-usage herein of the phrase "at least" nonetheless includes the possibility that other elements may exist besides those explicitly listed. For example, the phrase, 'based at least on A' includes A as well as the possibility of one or more other additional elements besides A. In the same manner, the phrase, 'based on A' includes A, as well as the possibility of one or more other additional elements besides A. However, the phrase, 'based only on A' includes only A. Similarly, the phrase 'configured at least to A' includes a configuration to perform A, as well as the possibility of one or more other additional actions besides A. In the same manner, the phrase 'configure to A' includes a configuration to perform A, as well as the possibility of one or more other additional actions besides A. However, the phrase, 'configured only to A' means a configuration to perform only A.

FIG. 1 shows a jewelry article 10 according to some embodiments of the present invention. The jewelry article 10 includes a substrate 11, such as a medallion made of metal, stone, or other material, on which micro- or nano-sized human readable information may be printed or etched. In some embodiments, the jewelry article 10 includes a wireless or optical tag 12 corresponding to the printed or etched human readable information. In some embodiments, the wireless or optical tag is associated with an electronic file corresponding to the printed or etched human readable information. In some embodiments, the wireless or optical tag is configured to be readable by an external reader connected to an external database that stores the electronic file corresponding to the printed or etched human readable information. In some embodiments, an external reader 13 (for example, as shown in FIG. 2) is configured to read the wireless or optical tag to access or retrieve the associated electronic file stored in the external database.

Figure 2:
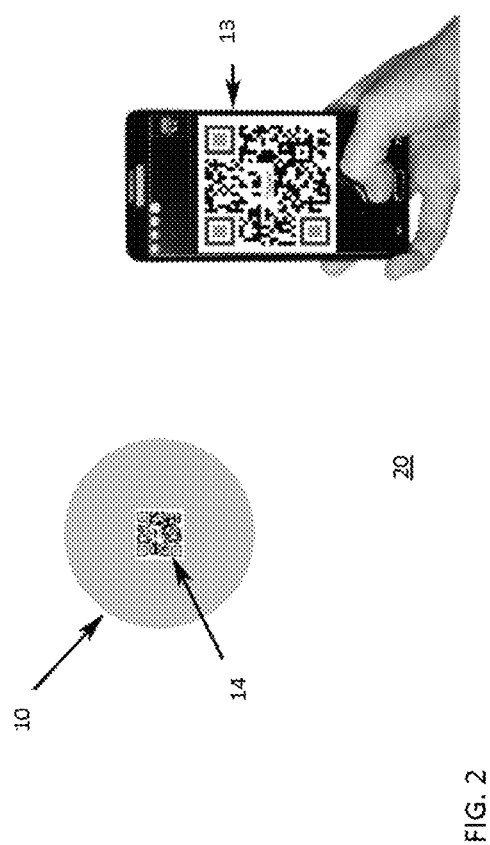
FIG. 2 shows a system with jewelry article including an optical tag, according to some embodiments of the invention.

FIG. 2 shows a system 20 including a jewelry article 10 and an external reader 13 configured to read an optical tag 14 included in the jewelry article 10, according to some embodiments. The optical tag 14 can include a QR code or a symbol. In some embodiments, the optical tag 14 is printed or etched on the jewelry article 10.

The exemplar embodiments of FIG. 2 illustrate a system that provides a QR code 14 to be printed or etched with the embedded written information to allow access to a unique set of instructions for an electronic device, such as the external reader 13, to provide a number of responses including accessing an exact digital replica of the written data or content related to the unique codes.

In some embodiments, the density of the QR code 14 is described by a version number that is based on the number of rows and columns of dots. A Version 1 QR code may have 21 rows and 21 columns of dots and the version number will then increase by 1 for every 4 extra rows and columns. Accordingly, a Version 2 QR code may have 25 rows and columns, a Version 3 may have 29 rows and columns, right through to a Version 25 that may have 117 rows and columns. In some embodiments of the micro- or nano-printed or etched jewelry article 10, each dot of the QR code can be as small as one pixel. Each pixel, depending on the technology used to etch, print, or record the pixel, can be sub-micron size.

The size of the QR code therefore needs to consider the resolution of the external reader or scanning/reading device 13 in order to provide proper read back. For example, current phone systems typically having 10 megapixel resolution cameras can resolve a QR code that is only a few millimeters wide and tall. An Atomic Force Microscope, on the other hand, can resolve a QR code that is only a few microns wide and tall.

In some embodiments, once the QR code has been read, and if it contains a unique set of codes that can direct the external reader (reading device) 13 to respond, the reading device 13 can execute instructions to access an external database and allow access to a digital replica of the printed or etched human readable information, or more electronically stored data corresponding to the instructions. In some embodiments, the database can reside either on the reading device 13 or can reside in a remote location separate from the reading device 13. If the database is stored in a remote location, the reading device 13 may include specific instruction on how to access such information. The instructions can also contain an encrypted security code that would only allow the reading device 13 to access the information in response to reading the optical tag 14. QR codes are generally readable by most smart phones, tablets, and portable gaming systems.

In some embodiments, the written content and related materials on the medallion can be associated with an optical symbol that can be recognized by the reading device 13 via optical means. There are numerous algorithms programmed into optical scanning devices that can correlate what the device sees optically, convert it into a digital format and then compare it to a look up table of characteristics that can identify the symbol and determine the unique set of information in the database that correspond to the symbol.

Figure 3:
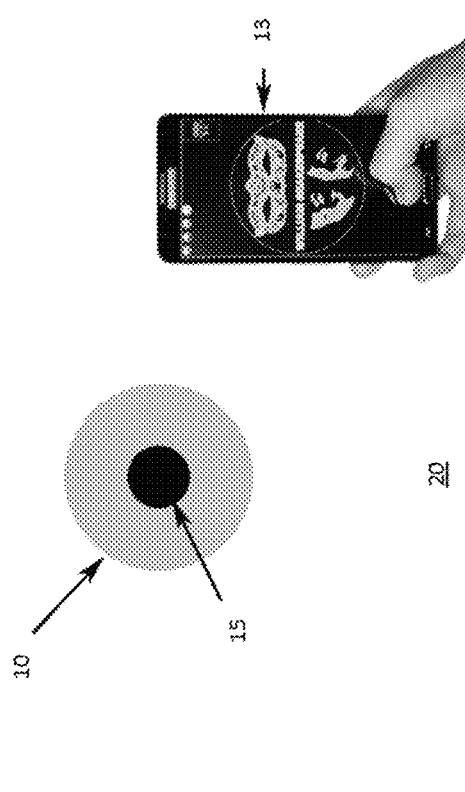
FIG. 3 shows a system with a jewelry article including a wireless tag, according to some embodiments of the invention.

FIG. 3 shows a system 20 including a jewelry article 10 and an external reader 13 configured to read a wireless tag 15 included in the jewelry article 10, according to some embodiments. In some embodiments, the wireless tag 15 can include an RF chip or an NFC chip. In some embodiments, the wireless tag 14 may be provided proximate a portion of the jewelry article where the human readable information is printed or etched.

Another embodiment for ease of data retrieval from micro and or nano-engraved jewelry is to have the wireless tag 15 embedded into the jewelry article 10.

There are several wireless technologies for wireless communications. An example is to have an RF chip embedded or attached to the jewelry. Another example would be to have an NFC chip embedded or attached to the jewelry.

In some embodiments, with an embedded wireless tag 15, an electronic device such as the external reader 13 would be equipped with at least a writer that can communicate to the embedded wireless device remotely. In some embodiments, a separate electronic device would be programmed to write a specific set of instructions into the embedded wireless tag 15 on the jewelry article 10. The instruction can contain encrypted security information to allow unique and secure way to access the information printed or etched on the jewelry article 10.

In some embodiments, to read back the wireless embedded or attached tag 15 on the wearable or portable jewelry article 10, an external reader 13 compatible with the wireless tag 15 can remotely access the unique set of instructions contained in the wireless embedded or attached tag 15.

In some embodiments, once the code from the wireless tag 15 has been read, and if it contains a unique set of codes that can direct the external reader (reading device) 13 to respond, the reading device 13 can execute instructions to access an external database and allow access to a digital replica of the printed or etched information, or more electronically stored data corresponding to the instructions. In some embodiments, the database can reside either on the reading device 13 or in a remote location separate from the reading device 13. If the external database is provided in a remote location, the reading device 13 may include specific instructions on how to access such information. The instructions can also contain an encrypted security code that would only allow the reading device 13 to access the information in response to reading the wireless tag 15.

With any of the embodiments described above, the information can contain a unique and secure code that can be of a large run length stored on the medallion 11 shown in FIG. 1. This information may be used as a key to unlock user personal information in purchasing applications such as e-commerce or in places that would offer a reader compatible with the information embedded onto the medallion itself.

In some embodiments, in the access or retrieval process, the instructions on the optical or wireless tag 12 included in the jewelry article 10 shown in FIG. 1 would not necessarily have to correspond exactly to the printed or etched information. The printed or etched information can be a symbol, graphics, or texts that represent a much bigger or differently formatted data set corresponding to the printed or etched information.

Figure 4:
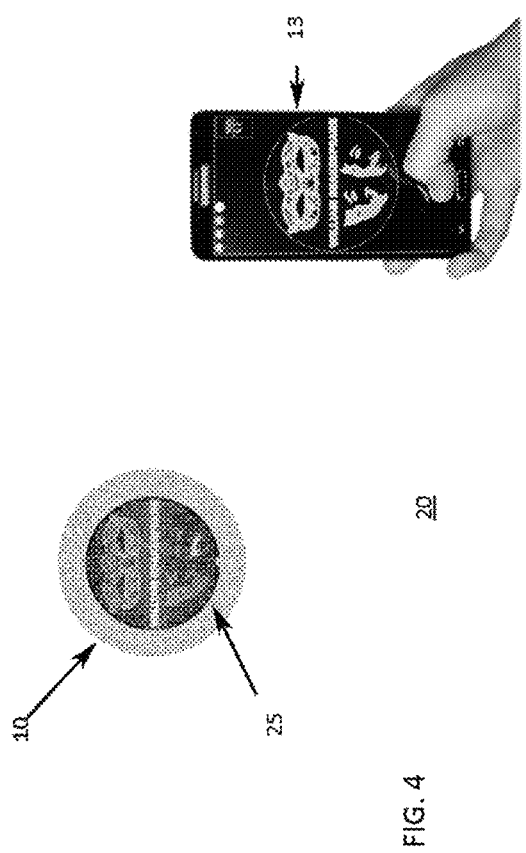
FIG. 4 shows an example implementation of a system with a jewelry article including printed or etched human readable information, according to some embodiments of the invention.
Figure 7:
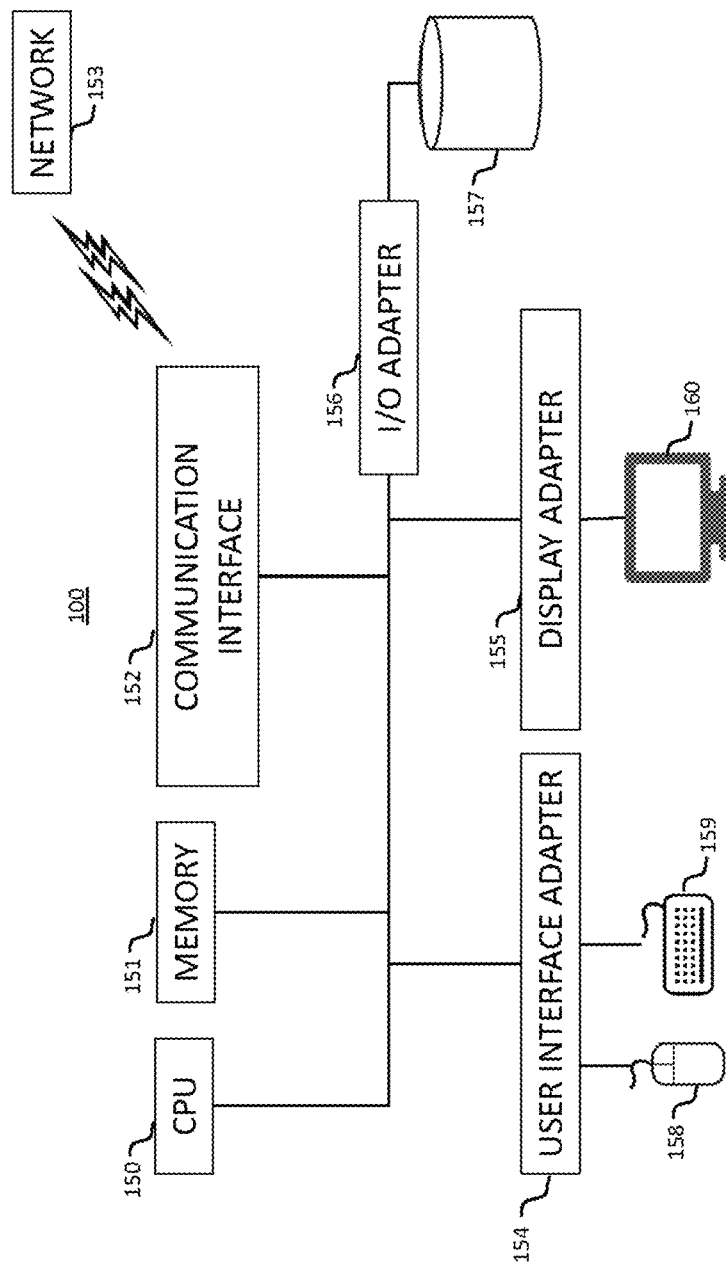
FIG. 7 shows a computing device system, which may be a particular implementation of all or part of the computing device system of FIG. 6, according to some embodiments of the invention.

For example, on a medallion 11 micro- or nano-printed or etched with Shakespeare's works 25, as shown in the exemplar system of FIG. 4, an optical or wireless tag can instruct the reading or electronic device 13 to access a database including audio information of the book being read or to access a video about the various works of Shakespeare. In some embodiments, the database may be stored in storage 157 shown in FIG. 7 and accessed by the electronic device 13 via network 153 shown in FIG. 7. The electronic file corresponding to the printed or etched human readable information 25 may be displayed on a display screen on the electronic device 13, or on any other associated display 160 as shown in FIG. 7.

Figure 5:
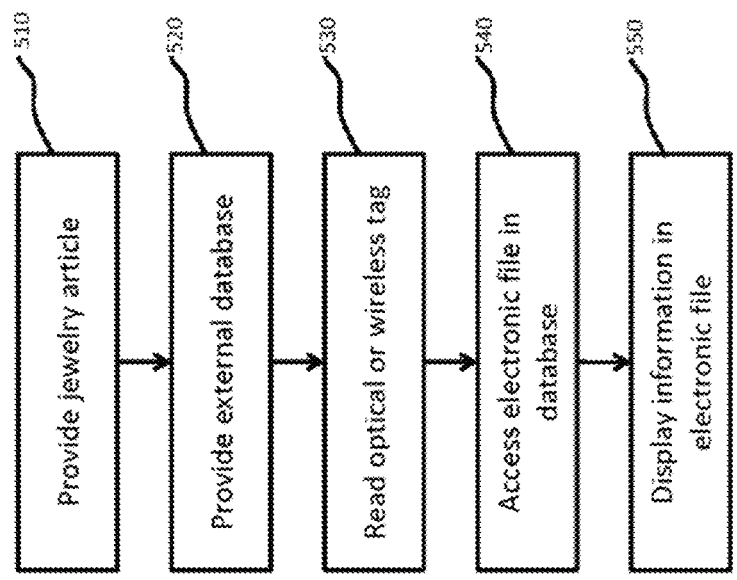
FIG. 5 is a flowchart showing a method of accessing information printed or etched on a jewelry article, according to some embodiments of the invention.

FIG. 5 is a flowchart showing a method of accessing information printed or etched on a jewelry article, according to some embodiments of the invention. In step 510, a jewelry article 10 is provided. The jewelry article 10 can include printed or etched human readable information that cannot be viewed without a visual aid, and a wireless or optical tag 12 corresponding to the printed or etched human readable information. In some embodiments, the wireless or optical tag 12 is configured to be readable by an external reader 13.

In step 520 an external database configured to store an electronic file corresponding to the printed or etched human readable information is provided. In some embodiments, the wireless or optical tag 12 is associated with the stored electronic file. In step 530, the wireless or optical tag 12 is read with the external reader 13. In step 540, information associated with or stored in the wireless or optical tag is used to access or retrieve the associated electronic file stored in the external database. In step 550, information included in the accessed or retrieved electronic file is displayed on the external reader 13, or on a display associated with the external reader 13.

Figure 6:
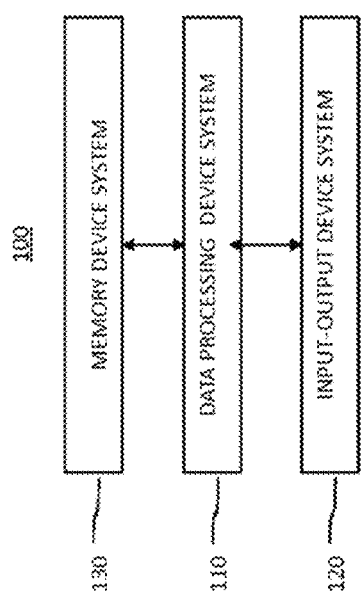
FIG. 6 shows a computing device system, according to some embodiments of the invention.

In some embodiments, the external database may be stored in a computing device system 100. FIG. 6 schematically illustrates a computing device system, according to some embodiments of the present invention. The system 100 may include a data processing device system 110, an input-output device system 120, and a processor-accessible memory device system 130. The processor-accessible memory device system 130 and the input-output device system 120 are communicatively connected to the data processing device system 110. In some embodiments, the phrase "computing device" may be defined as the entirety of the system 100. In some embodiments, the phrase "computing device" may be defined as all or a portion of the data processing device system 110. In some embodiments, the phrase "computing device system" may be defined as one or more computing devices.

The data processing device system 110 may include one or more data processing devices that implement or execute, in conjunction with other devices, such as one or more of those in the system 100, methods of various embodiments of the present invention, including at least some of the steps of the example method of FIG. 5 described herein. Each of the phrases "data processing device", "data processor", "processor", "computing device", and "computer" is intended to include any data processing device, such as a central processing unit ("CPU"), a desktop computer, a laptop computer, a mainframe computer, a tablet computer, a smartphone, a personal digital assistant, and any other device configured to process data, manage data, or handle data, whether implemented with electrical, magnetic, optical, biological components, or other.

The memory device system 130 may include one or more processor-accessible memory devices configured to store program instructions and other information, including the external database that stores the electronic file corresponding to the printed or etched information, and program instructions needed to execute at least some of the steps of the methods of various embodiments, including the example method of FIG. 5 described herein. In this regard, at least some of the steps illustrated in the example methods of FIG. 5 may represent program instructions stored in the memory device system 130 and configured to cause execution of the respective step. The memory device system 130 may be a distributed processor-accessible memory device system including multiple processor-accessible memory devices communicatively connected to the data processing device system 110 via a plurality of computers and/or devices. On the other hand, the memory device system 130 need not be a distributed processor-accessible memory system and, consequently, may include one or more processor-accessible memory devices located within a single data processing device.

Each of the phrases "processor-accessible memory" and "processor-accessible memory device" and the like is intended to include any processor-accessible data storage device or medium, whether volatile or nonvolatile, electronic, magnetic, optical, or otherwise, including but not limited to, registers, floppy disks, hard disks, Compact Discs, DVDs, flash memories, ROMs, and RAMs. In some embodiments, each of the phrases "processor-accessible memory" and "processor-accessible memory device" is intended to include or be a processor-accessible (or computer-readable) data storage medium. In some embodiments, each of the phrases "processor-accessible memory" and "processor-accessible memory device" is intended to include or be a non-transitory processor-accessible (or computer-readable) data storage medium. In some embodiments, the processor-accessible memory device system 130 may be considered to include or be a non-transitory processor-accessible (or computer-readable) data storage medium system. And, in some embodiments, the memory device system 130 may be considered to include or be a non-transitory processor-accessible (or computer-readable) storage medium system or data storage medium system including or consisting of one or more non-transitory processor-accessible (or computer-readable) storage or data storage mediums.

The phrase "communicatively connected" is intended to include any type of connection, whether wired or wireless, between devices, data processors, or programs in which data may be communicated. Further, the phrase "communicatively connected" is intended to include a connection between devices or programs within a single data processor, a connection between devices or programs located in different data processors, and a connection between devices not located in data processors at all. In this regard, although the memory device system 130 is shown separately from the data processing device system 110 and the input-output device system 120, one skilled in the art will appreciate that the memory device system 130 may be located completely or partially within the data processing device system 110 or the input-output device system 120. Further in this regard, although the input-output device system 120 is shown separately from the data processing device system 110 and the memory device system 130, one skilled in the art will appreciate that such system may be located completely or partially within the data processing system 110 or the memory device system 130, depending on the contents of the input-output device system 120. Further still, the data processing device system 110, the input-output device system 120, and the memory device system 130 may be located entirely within the same device or housing or may be separately located, but communicatively connected, among different devices or housings. In the case where the data processing device system 110, the input-output device system 120, and the memory device system 130 are located within the same device, the system 100 of FIG. 6 may be implemented by a single application-specific integrated circuit (ASIC) in some embodiments.

The input-output device system 120 may include a mouse, a keyboard, a touch screen, a computer, a processor-accessible memory device, a network-interface-card or network-interface circuitry, or any device or combination of devices from which a desired selection, desired information, instructions, or any other data is input to the data processing device system 110. The input-output device system 120 may include a user-activatable control system that is responsive to a user action. The input-output device system 120 may include any suitable interface for receiving a selection, information, instructions, or any other data from other devices or systems described in various ones of the embodiments.

The input-output device system 120 also may include an image generating device system, a display device system, a speaker device system, a computer, a processor-accessible memory device system, a network-interface-card or network-interface circuitry, or any device or combination of devices to which information, instructions, or any other data is output by the data processing device system 110. In this regard, the input-output device system may include various other devices or systems described in various embodiments. The input-output device system 120 may include any suitable interface for outputting information, instructions, or data to other devices and systems described in various ones of the embodiments. If the input-output device system 120 includes a processor-accessible memory device, such memory device may or may not form part or all of the memory device system 130.

According to various embodiments of the present invention, the system 100 includes some or all of the systems shown in FIG. 7.

FIG. 7 shows an example of a computing device system 200, which may be a particular implementation of all or part of the computing device system 100 of FIG. 6, according to some embodiments. The computing device system 200 may include a processor 150, which may correspond to an embodiment of the data processing device system 110 of FIG. 6, in some embodiments. The non-transitory random-access memory 151, input/output (I/O) adapter 156, and non-transitory storage medium, such as a hard disk drive, 157 may correspond to an embodiment of the processor-accessible memory device system 130 of FIG. 6, according to some embodiments. Although, the I/O adapter 156 may also be considered part of the input-output device system 120 of FIG. 6, according to some embodiments. The user interface adapter 154, mouse 158, keyboard 159, display adapter 155, display 160, and communication interface 152 may correspond to an embodiment of the input-output device system 120 of FIG. 6, according to some embodiments. The communication interface 152 communicatively connects to a communications network 153 for communicating with other computing device systems 200 or 100 according to some embodiments.

The processor-accessible memory device system 130 of FIG. 6 may store one or more databases external from the jewelry article. The databases may store one or more electronic files associated with one or more printed or etched human readable information included in the jewelry article. In some embodiments, the electronic file may include a digital replica of the printed or etched human readable information or may include additional digital content associated with the printed or etched human readable information. In some embodiments, the printed or etched human readable information may include one or more of micro-sized or nano-sized text, image, video, audio, or other multimedia information.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MYSQL, Interbase, etc., may be used to provide an Active Data Object (ADO) compliant database management system.

Because data may be written from any media source, a website and/or web page may be used as a source of images and/or other data to be recorded. Further, any of the communications, inputs, storage, databases or displays discussed herein may be facilitated through a website having web pages. The term "web page" as it is used herein is not meant to limit the type of documents and applications that might be used to interact with the user.

In some embodiments, the jewelry article, systems, and methods discussed above may be used in various applications.

In some embodiments, in an application for music, a jewelry article 10 may be micro- or nano-printed or etched with the lyrics and musical notations, and the instructions can direct the reader to access the musician's audio or video playback of the music.

In some embodiments, in an application for movies, a jewelry article 10 may be micro- or nano-printed or etched with the lyrics and musical notations, and the instructions can direct the reader to access the movie. The wireless or optical tag 12 can also contain a unique secure and encrypted code to allow only the holder of the jewelry article 10 to access the movie. This can be a great tool to distribute paid content.

In some embodiments, in an application for software, a jewelry article 10 may be micro- or nano-printed or etched with the logo for the software application, and the instructions can direct the reader to access a portal or unlock the content of the software.

In some embodiments, in an application for books, a jewelry article 10 may be micro- or nano-printed or etched with the cover page of the book, and the instructions can direct the reader to access a portal or unlock the content of the book.

The jewelry article 10 may be used for any application that would require easy access to a much bigger database than what is printed or etched on the jewelry article 10.

In some embodiments, the jewelry article 10 may be, but not limited to, wearable technology such as watches, rings, and pendants that contain micro-indicia with the means to allow communication with a remote device or external reader 13.

Another application for the jewelry article 10 is to allow access of the micro- or nano-printed or etched texts, images, and patterns to be displayed on a computing device that displays the information in a 2D or 3D format. In a 2D format the entire collection of pages or images may be broken up into smaller files that are stitched together to be viewable at zoom level. For example a zoomed out image can show the image of a mask, but when zoomed in, will display the micro indicia representing detailed information. An application of such use is in the quality control of microchips in the manufacturing process. An automated microscope can automatically scan the entire surface of a 6 inch wafer in segments of 1 mm view and store them in a database. This database can be accessed using a QR or barcode or wireless or optical recognition marker to access the information to be displayed in a zoomable 2D or 3D format. This is similar to mapping technologies such as Google Map and Google Earth but applied to micro features.

Another application could be in the medical field for microfluidics or microchannel chips used to detect diseases by determining the type of virus, proteins, or other organics.

The detailed description of exemplary embodiments of the invention herein shows various exemplary embodiments and the best modes, known to the inventors at this time, of the invention are disclosed. These exemplary embodiment and modes are described in sufficient detail to enable those skilled in the art to practice the invention and are not intended to limit the scope, applicability, or configuration or the invention in any way. Rather, the following disclosure is intended to teach both the implementation of the exemplary embodiments and modes and any equivalent modes or embodiments that are known or obvious to those of reasonably skill in the art. Additionally, all included figures are non-limiting illustrations of the exemplary embodiments and modes, which similarly avail themselves to any equivalent modes or embodiments that are known or obvious to those of reasonably skill in the art.

As used herein, the terms "comprise", "comprises", "comprising", "having", "including", "includes", or any variation thereof, are intended to reference a non-exclusive inclusion, such that a process, method, article, composition or apparatus that comprises a list of elements does not include only those elements recited, but may also include other elements not expressly listed and equivalents inherently known or obvious to those of reasonable skill in the art. Other combinations and/or modifications of structures, arrangements, applications, proportions, elements, materials, or components used in the practice of the instant invention, in addition to those not specifically recited, may be varied or otherwise particularly adapted to specific environments, manufacturing specifications, design parameters or other operating requirements without departing from the scope of the instant invention and are intended to be included in this disclosure.

Moreover, unless specifically noted, it is the Applicant's intent that the words and phrases in the specification and the claims be given the commonly accepted generic meaning or an ordinary and accustomed meaning used by those of ordinary skill in the applicable arts. In the instance where these meanings differ, the words and phrases in the specification and the claims should be given the broadest possible, generic meaning. If it is intended to limit or narrow these meanings specific, descriptive adjectives will be used. Absent the use of these specific adjectives, the words and phrases in the specification and the claims should be given the broadest possible meaning. If any other special meaning is intended for any word or phrase, the specification will clearly state and define the special meaning.

The invention claimed is:

1. A jewelry article comprising:
   printed or etched human readable information that cannot be viewed without a visual aid; and
   a wireless or optical tag corresponding to the printed or etched human readable information,
   wherein the wireless or optical tag is associated with an electronic file that is a replica of the printed or etched human readable information,
   wherein the wireless or optical tag is configured to be readable by an external reader connected to an external database that stores the electronic file that is the replica of the printed or etched human readable information, and
   wherein the external reader is configured to read the wireless or optical tag to access the associated electronic file stored in the external database.

2. The jewelry article according to claim 1,
   wherein the wireless or optical tag is configured to store a unique code corresponding to the printed or etched human readable information, and
   wherein the unique code is associated with the electronic file that is the replica of the printed or etched human readable information.

3. The jewelry article according to claim 1, wherein the electronic file includes additional digital content associated with the printed or etched human readable information.

4. The jewelry article according to claim 1, wherein the printed or etched human readable information includes micro- or nano-text, image, video, or audio.

5. The jewelry article of claim 1, wherein the wireless tag includes an RF chip or an NFC chip.

6. The jewelry article of claim 1, wherein the optical tag includes a QR code or a symbol.

7. The jewelry article of claim 1, wherein the optical tag is printed or etched on the jewelry article.

8. The jewelry article of claim 1, wherein the wireless tag is provided proximate a portion of the jewelry article where the human readable information is printed or etched.

9. The jewelry article of claim 1, wherein the wireless or optical tag includes security information to permit the external reader to access the external database and retrieve the associated electronic file that is the replica of the printed or etched human readable information.

10. The jewelry article of claim 1, wherein the external reader is further configured to display information included in the associated electronic file stored in the external database.

11. A system comprising:
    a jewelry article including printed or etched human readable information that cannot be viewed without a visual aid and a wireless or optical tag corresponding to the printed or etched human readable information; and
    an external database configured to store an electronic file that is a replica of the printed or etched human readable information,
    wherein the wireless or optical tag is associated with the stored electronic file,
    wherein the wireless or optical tag is configured to be readable by an external reader connected to the external database, and wherein the external reader is configured to read the wireless or optical tag to access the associated electronic file stored in the external database.

12. The system according to claim 11,
wherein the wireless or optical tag is configured to store a unique code corresponding to the printed or etched human readable information, and
wherein the unique code is associated with the electronic file that is the replica of the printed or etched human readable information.

13. The system according to claim 11, wherein the electronic file includes additional digital content associated with the printed or etched human readable information.

14. The system according to claim 11, wherein the printed or etched human readable information includes micro- or nano-text, image, video, or audio.

15. The system according to claim 11, wherein the wireless or optical tag includes security information to permit the external reader to access the external database and retrieve the associated electronic file that is the replica of the printed or etched human readable information.

16. The system according to claim 11, wherein the external reader is further configured to display information included in the associated electronic file stored in the external database.

17. A method of accessing an electronic file that is a replica of printed or etched human readable information on a jewelry article, the method comprising:

providing the jewelry article including the printed or etched human readable information that cannot be viewed without a visual aid, the jewelry article including a wireless or optical tag corresponding to the printed or etched human readable information, the wireless or optical tag configured to be readable by an external reader;

providing an external database configured to store an electronic file that is the replica of the printed or etched human readable information, wherein the wireless or optical tag is associated with the stored electronic file; and reading the optical or wireless tag with the external reader to access the associated electronic file stored in the external database.

18. The method according to claim 17, further including displaying information included in the associated electronic file stored in the external database.

* * * * *